May 17, 1927.
P. B. JOHNSON
STACKER
1,628,725
Original Filed Sept. 10, 1925
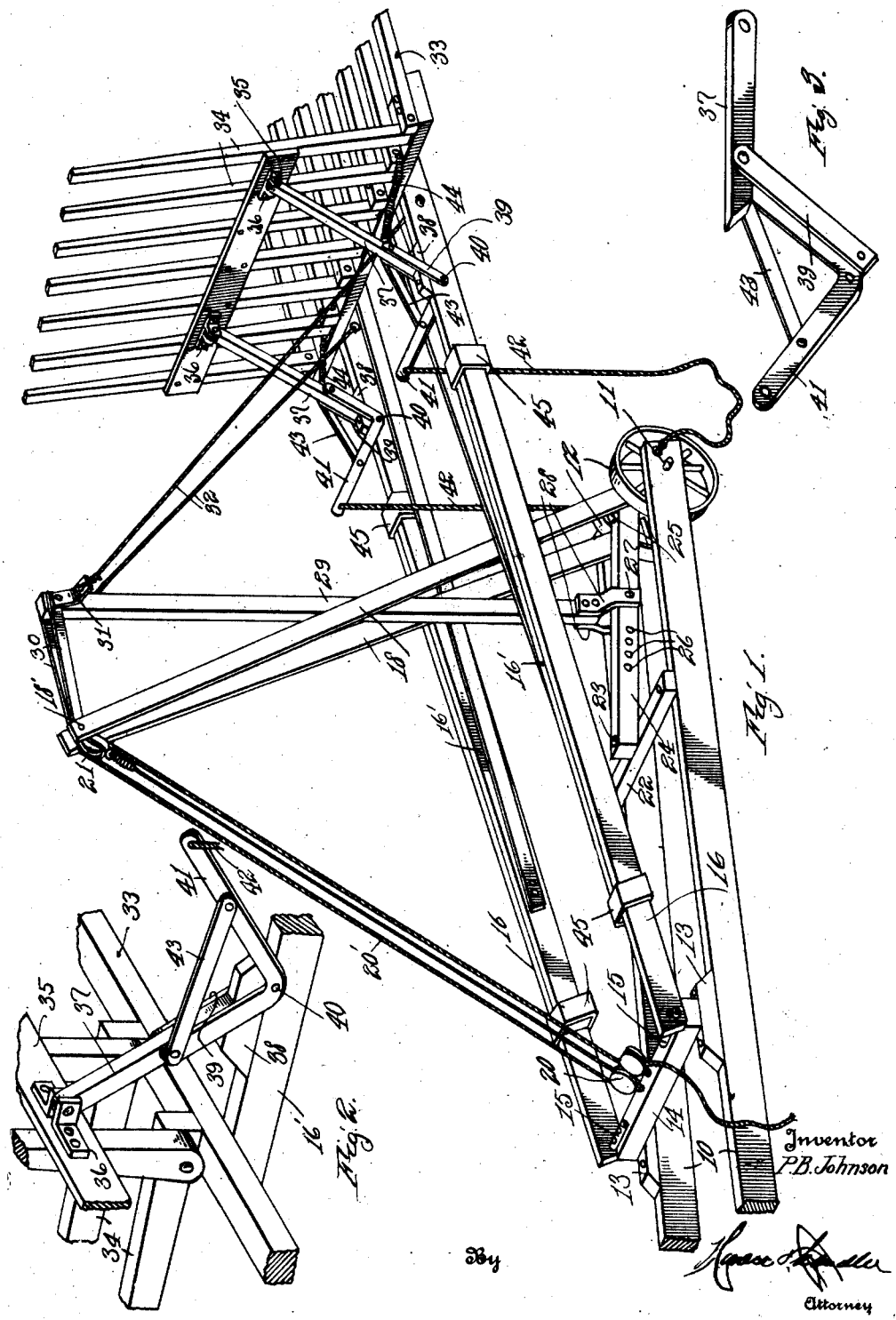

Patented May 17, 1927.

1,628,725

UNITED STATES PATENT OFFICE.

PETER B. JOHNSON, OF FREMONT, NEBRASKA.

STACKER.

Application filed September 10, 1925, Serial No. 55,514. Renewed December 3, 1926.

This invention relates to new and useful improvements in stackers.

One object of the invention is to provide a device of this character which is simple in construction, durable and effective in operation, and which can be easily handled.

Another object is to provide a device of this character wherein the sweep arms of the rake are more easily raised and lowered, and with the expenditure of the minimum of power.

A further object is to provide a novel trip means for holding the tilting element of the rake in load retaining position, and which is readily and automatically released to dump the load.

A still further object is to provide a trip means which will automatically resume its normal operative position, after the load has slipped from the rake.

Other objects and advantages will be apparent from the following description when taken in connection with the accompanying drawing.

In the drawing:

Figure 1 is a perspective view of a stacker, made in accordance with the present invention, and showing the rake partly elevated.

Figure 2 is a fragmentary detail view of the latch, in the position assumed when the parts of the stacker are as shown in Figure 1.

Figure 3 is a fragmentary detail view of the latch, in tripped position.

Referring particularly to the accompanying drawing, 10 represents a pair of approximately horizontal bars which converge toward one end, and supported in the converged ends of said bars is the transverse axle 11, having the ground wheels 12 thereon, for supporting said converged ends above the ground. On the upper faces of the rear portions of the bars 10 are mounted the blocks 13, which have secured to the upper faces thereof, the ends of the transverse beam 14. Secured on the end portions of the upper face of this beam 14, are the longitudinally extending pivot members 15, the outer ends of which project beyond the ends of the beam, and are disposed in openings in the adjacent ends of the side bars 16', whereby said bars are supported for vertical swinging movement.

Pivotally supported on the axle 11 are the lower ends of the upwardly converging beams 18, which form part of the mast of the stacker, and connecting the converged ends of the beams 18 is a transverse pin or bolt 18', on which is supported the block and tackle 21. On the intermediate portion of the beam 14 is mounted a similar block and tackle 20, which connects with the block and tackle 21 by means of the rope 20'. Secured to the bars 10, and extending therebetween, rearwardly of the axle 11, is a beam 22, and secured thereto by the bolt 23, is one end of a longitudinally extending bar 24, the other end of which rests on the intermediate portion of the axle 10, and receives the stem of the eye bolt 25, through the eye of which is received the said axle. Formed transversely through this bar 24 are the longitudinal series of openings 26, for the reception of a bolt 27 which is engaged through the ends of the plates 28, which are secured to the lower end of the upright 29. Connecting the upper end of this upright 29 with the upper end of the mast, is a spacing bar 30, and secured to opposite sides of the upper end of the upright are the angle brackets 31, in which are secured the upper ends of the downwardly and forwardly extending guys 32. The lower ends of these guys are connected with the forward portions of the sections 16', as clearly seen in the drawing.

Secured to the forward ends of the sections 16' is the rake 33, and pivotally connected to the inner end of each of the tines thereof is the right angularly extending tine 34. Connecting these tines 34, and extending in parallel relation to the axle 11, is the bar 35, and carried by the rear face of this bar 35, adjacent the ends thereof, are the brackets 36, in each of which is pivotally mounted the upper end of the latch bar 37. The latch bar extends downwardly, and rearwardly away from the tines 34, and has its lower end beveled and resting normally on the upper face of a block 38 carried by the bar 16'. Pivotally secured to one side of the latch bar 37, is the upper end of a link 39, the other end of which is pivotally connected to one side of the bar section 16', the pivot 40 of which extends through said bar section and passes through the angle of a bell crank lever 41, disposed at the other side of the said bar section. The extremity of one arm of this bell crank lever 41 is engaged on the upper pivot of the link 39, while the other arm has a cable 42 secured thereto. Also mounted on the upper pivot of the bell crank lever is one end of a bracing link 43, the other end of said link being bolted to the intermediate portion of the rope or cable carrying end of the bell crank lever.

The link 39, and the adjacent arm of the bell crank lever 41 straddle the said block 38, whereby to properly position the foot of the latch bar 37 on the block. A pair of coil springs 44 are secured to the upper pivot of the link 39 and bell crank lever, at one end, and to the pivot of the adjacent tine 34, whereby to yieldably maintain the parts in such position that the latch bar rests on the block 38.

Figures 1 and 2 show the stacker and latch in normal position, or that position for lifting a load of hay. It will be understood that the rake is lowered until it rests on the ground, when in position to receive a load of hay from a bull rake.

Upon pulling on the rope or cable, at the block 20, the mast, including the beams 18 and the upright 29, will be rocked rearwardly on the axle 11, as the pivot, carrying the bars 16, together with the rake, upwardly and over the mast, into an approximately vertical position, in which the load of hay will be supported on the tines 34. Upon reaching this position, the ropes or cables 42 will become taut, with the result that the angle or bell crank levers 41 will be rocked on their pivots. As the bell cranks rock on their pivots, they operate through the upper pivots, on the latch bars 27, lifting them from the blocks 38, whereupon the weight of the hay will cause the tines 34 to swing downwardly, and the said hay slip therefrom. As the tines 34 swing downwardly, under the weight of the hay, the springs 44 will be stretched, as will be understood, and the feet of the latch bars 37 slide downwardly on the faces of the bars 16. Immediately after the hay has slipped from the rake, the springs 44 draw the latch bars back into normal position, so that the tines 34 will be swung into their former positions for retaining another load of hay, upon again swinging the bars 16 through the position of Figure 1, and downwardly to the ground. As the bars 16 start back toward normal position, the cables 42 will be slackened, so that the springs 44 can restore the latches to normal position.

The bar sections 16' are slidably connected to the sections 16 by means of the collars or clamps 45, whereby the sections 16' may be slipped longitudinally of the bars 16, to extend the rake outwardly, or withdraw the same inwardly, in accordance with the height of the hay on the stack. As the stack grows, it becomes necessary to cause the rake to be lifted to a greater height, therefore, by sliding the sections 16' outwardly, the rake will swing higher, as the same is moved in the direction of the stack.

What is claimed is:

1. A stacker including a supporting frame, a swingable frame on the supporting frame having a movable load gathering and dumping portion, means between the dumping portion and the swingable frame for retaining said portion in load supporting position, and connections between said means and the supporting frame whereby to release said means and permit said portion to dump its load upon movement of the swingable frame to a predetermined position.

2. A stacker including a supporting frame, a vertically swingable frame mounted thereon and having a dumping rake thereon, latch means between the rake and swingable frame for holding the rake in load supporting position, and connections between the latch means and the supporting frame for releasing the former upon movement of the swingable frame to a predetermined position.

3. A stacker including a frame, a vertically swingable rake on the frame and including a movable dumping part, a latch carried by said dumping part and engaged with the swingable portion of the rake, and means movably mounted on said swingable portion and operatively connected with the latch and said frame whereby to automatically release the latch upon the rake assuming an elevated position.

4. A stacker including a frame, arms pivotally supported on the frame and carrying a rake which includes a dumping section, stop means on the arms, a latch pivotally carried by each side of the dumping section and normally engaged with the stop means to hold said section in load retaining position, and means movably carried by the arms and connected with the latches and with the said frame for releasing the latches from the stop means upon elevation of said rake.

5. A stacker including a frame, arms pivotally supported on the frame and having a rake including a pivoted dumping section, a stop on an arm, a latch bar pivotally carried by the dumping section and engaged with the stop, a crank arm pivotally supported on the arm and operatively connected with the latch, and means between the crank arm and frame whereby to automatically disengage the latch bar from the stop upon elevation of the rake.

6. A stacker including a frame, arms pivotally supported on the frame and having a rake including a dumping section, stop means on the arms, latch bars pivotally carried by the dumping section and engaged with the stop means, links pivotally connected to the latch bars and arms, crank arms pivotally connected with the latch bars and with the arms, and flexible elements connected to the cranks and to the frame for automatically releasing the latch bars from the stop means upon elevation of the rake to permit said dumping section to release the load, and spring means for restoring the latch bars to normal engagement with the stop means.

In testimony whereof, I affix my signature.

PETER B. JOHNSON.